Dec. 1, 1942.    C. E. FRASER    2,303,535
FILTER BED SCRAPER
Filed July 1, 1939    2 Sheets-Sheet 1
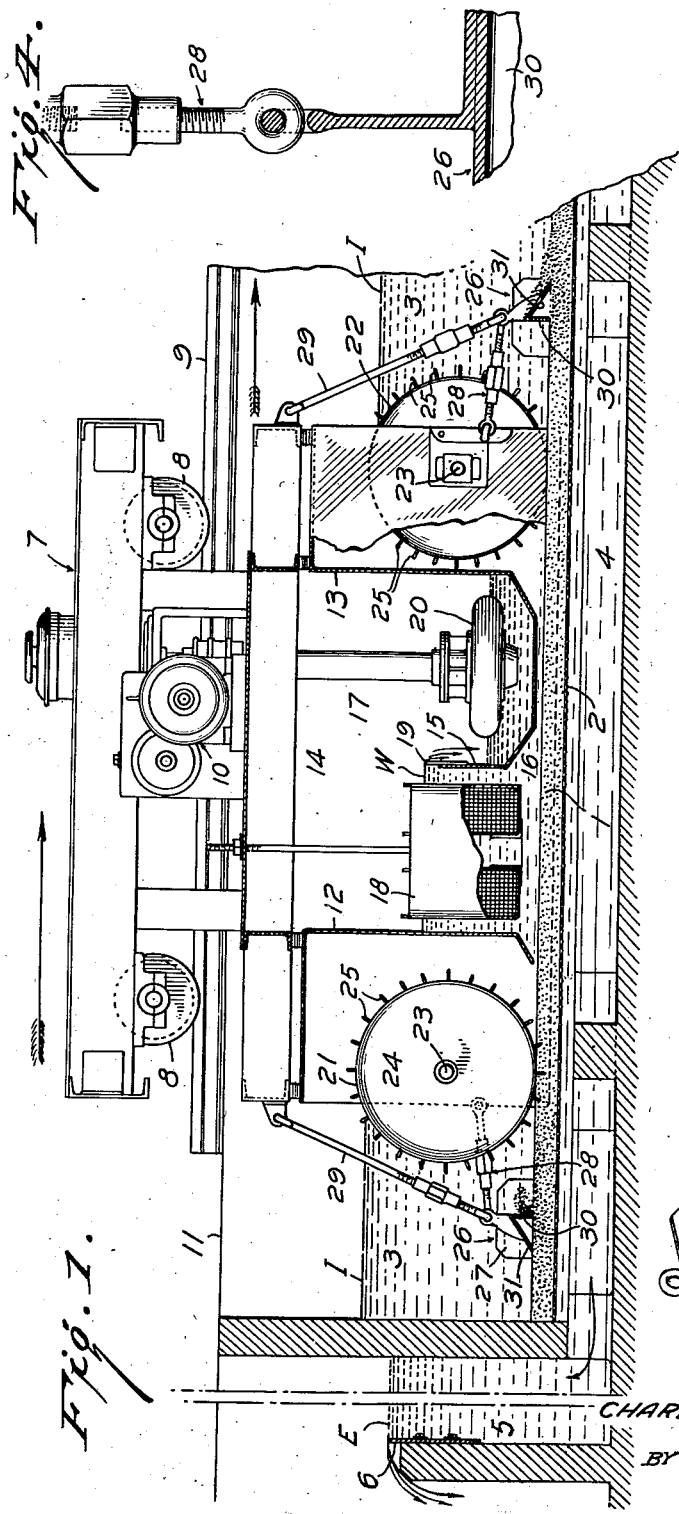
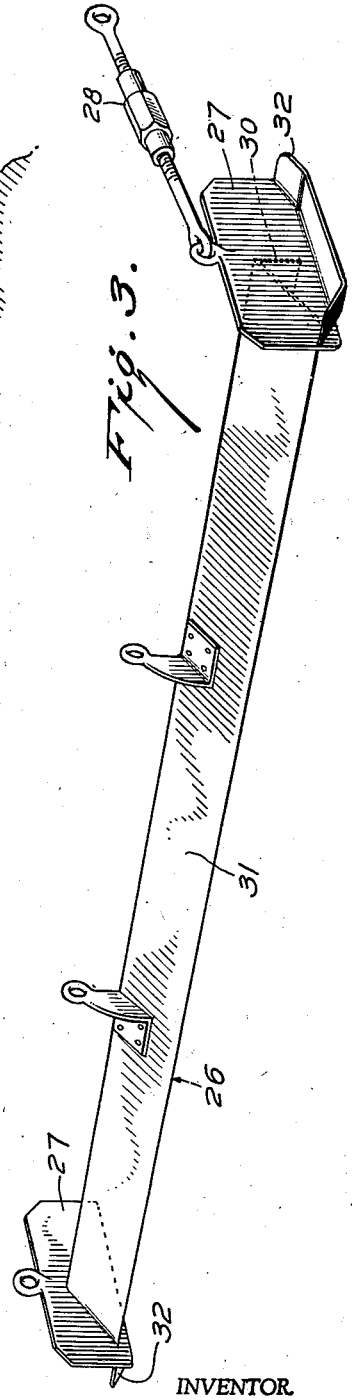
INVENTOR.
CHARLES E. FRASER,
BY
ATTORNEY.

Dec. 1, 1942.   C. E. FRASER   2,303,535
FILTER BED SCRAPER
Filed July 1, 1939   2 Sheets-Sheet 2

INVENTOR.
CHARLES E. FRASER,
BY
ATTORNEY.

Patented Dec. 1, 1942

2,303,535

UNITED STATES PATENT OFFICE 2,303,535

FILTER BED SCRAPER

Charles Edward Fraser, Kew Gardens, N. Y.

Application July 1, 1939, Serial No. 282,467

3 Claims. (Cl. 210—128)

The present invention relates to a method of and mechanism for cleaning filter beds.

It is common practice in the treatment of sewage, industrial wastes, etc., to pass liquids containing the same through relatively shallow beds of sand, aggregate or the like, which removes the solids therefrom. Such beds, in the course of time, become clogged with the retained material, even though the raw material undergoing treatment has been subjected to preliminary sedimentation or the like. As a consequence, it becomes necessary to restore the bed to somewhere near its initial solid removal capacity and this may be done by cleaning either intermittently or continuously.

A popular type of cleaning mechanism for the above purpose consists of a traveling cleaner operated above the bed, which includes a cleaner caisson, the lower extremity of which is in proximity to the bed. The caisson is intended to make a sealing contact with a portion of the bed immediately thereunder and this is accomplished usually by extending the side walls of the caisson into the bed material a sufficient distance and by providing sealing means, such as buoyant drums at each end of the caisson. Consequently, a portion of the bed is completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influence so as to provide a sufficient hydraulic head to cause liquid movement through the bed. As the efficiency of a filter bed changes from time to time due to the quantum of retained solids therein, means are provided for varying the hydraulic head between the influent and effluent levels. This may conveniently take the form of an adjustable weir on the effluent discharge. This weir is frequently automatically operated by a float on the influent side of the filter.

A convenient method of agitating a portion of the filter bed to clean the same may take the form of an intermittently operated solenoid where the bed material is of the magnetite sand variety. This electromagnet being located relatively close to the bed, when energized, lifts a section of the magnetite sand immediately thereunder and this movement tends to separate the solids caught by the sand therefrom. Inasmuch as the lifting of this magnetite creates a zone of lessened resistance in the bed at that point, if the effluent level is higher than the wash water level in the solenoid compartment in the caisson, there will be a back rush of clean effluent up through the bed at the area of lessened resistance which washes the loosened solids from the magnetite, over the partition between the agitation compartment and wash water box and into the latter from which it is removed by a pump. Upon deenergizing the magnet, the magnetite is released and drops back into its place in the bed. This procedure may take place continuously, although it is understood that the energization and deenergization of the solenoid takes place intermittently.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. As before, the cleaner mechanism creates an area of agitation in the bed, but in this case, the flood of water through the area of lessened resistance caused thereby is that of unfiltered effluent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, little or no filtering action takes place in the area covered by the cleaning mechanism.

In the case of downflow filters, this seal prevents the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

As there is always some movement of liquid above the bed, in both types of filters, this has a tendency to create hills and valleys in the bed surface which make it difficult to maintain this desirable seal between the cleaning mechanism and the bed material. Moreover, there is also a tendency to build up a volume of undistributed bed material at the sides of the filter in annular beds and at the sides and ends of rectangular beds. Unless this situation is minimized, inefficient sealing results, with consequent leakage and contamination of the effluent.

The principal object of the present invention, therefore, is to provide mechanism movable over the bed with the traveling cleaner which will aid in leveling the bed and thereby assist in maintaining a seal between the cleaner mechanism and the bed, and to cause a redistribution of accumulated bed material over the filter area.

To this end, the invention in one of its broadest aspects contemplates in both up and down-filter systems, a filter bed with a traveling cleaner adapted to move over the same and create a zone of agitation in the bed for cleaning purposes, with means to level the bed before and/or after the travel of the cleaner over the same so as to assist in maintaining a seal in the case of the former and to leave the bed in a level condition suitable for efficient filtration and sealed cleaning in the case of the latter, while at the same time redistributing accumulated bed material at the sides and/or ends of the bed area.

The invention further contemplates inverted V-shaped plows having a vertical and an angular face, ahead of and/or behind the cleaner mechanism, capable of being raised or lowered to the desired position and/or capable of being adjusted at an angle to the direction of travel of the cleaner, which will level the bed. Such plows, when positioned ahead of the cleaner mechanism may be made to gather the excess bed material piled up at the end of a rectangular tank and upon reversal of movement of the cleaner mechanism distribute such excess over the bed. By arranging the same at an angle to the direction of travel of the cleaner, excess bed material may be brought in from the sides thereof and redistributed.

The invention further consists in the novel arrangement, combination and construction of parts more fully hereinafter described and shown in the accompanying drawings, in which—

Fig. 1 is a side elevation of a device embodying the present invention;

Fig. 3 is a perspective detail of the plow; and

Fig. 4 is a detail of the plow adjustment mechanism.

Figure 2:
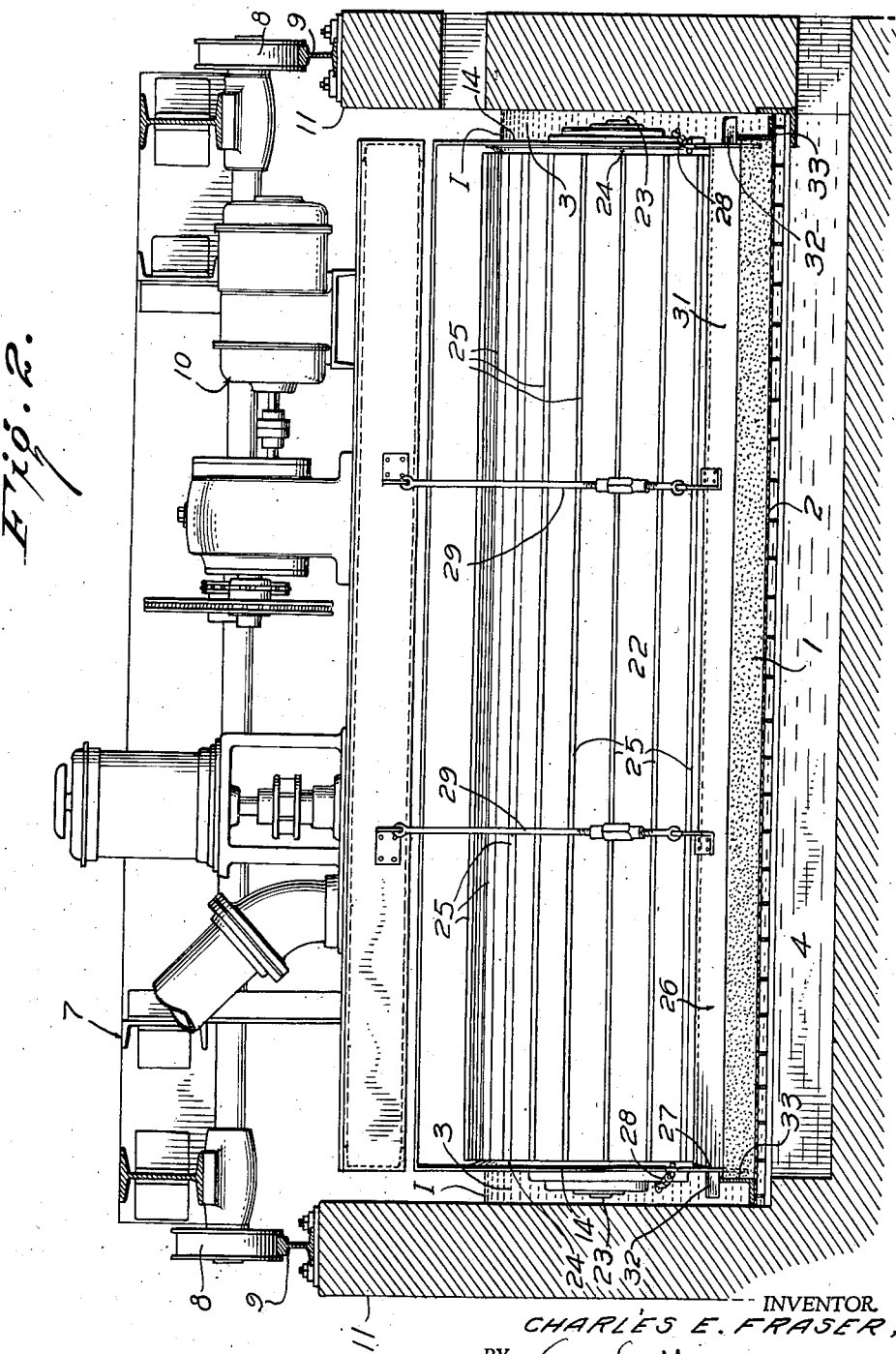
Fig. 2 is an end view of the device of Fig. 1.

Referring now with particularity to the embodiment shown in Fig. 1, a filter of the downflow type is shown to include a filter bed 1 of any suitable material including sand of the magnetite or other variety supported upon screen 2.

Influent 3 to be filtered is flowed on top of the bed to maintain a level I sufficient to cause flow through the bed. The clean effluent 4 below the bed, rises in a channel 5 to the level E, sufficiently below the influent level I to give the proper hydraulic head to the latter. A weir 6 is used to determine the level E.

A cleaner mechanism supporting trolley is shown generally at 7 mounted on wheels 8 and movable on track 9 through prime mover 10, all of which is carried on the top of side walls 11 of the filter bed canal.

The actual cleaner mechanism supported by the trolley includes a front wall 12, a rear wall 13 and side walls 14 forming an enclosure which is divided into a cleaning compartment 16 and a wash water compartment 17, by intermediate wall 15.

For the sake of illustration only, an electromagnet is shown at 18 as constituting the means for creating the zone of agitation in the magnetite sand of the bed, although any other mechanism, either mechanical or hydraulic, may be used to cause agitation. This electromagnet is connected to a suitable source of electrical energy adapted to intermittently energize the same. Upon energizing the magnet, the magnetite immediately thereunder is lifted from the bed, a zone of agitation created therein which loosens the dirt held in the bed particles and due to the greater hydraulic head of the influent above the bed, causes an upflow of clean effluent through the bed and through the area of lessened resistance below the solenoid which carries the loosened dirt over the top of adjustable weir 19 and into the cleaner caisson 17 from which it is removed by pump 20 for further disposal or return to the system after treatment, as desired. Upon de-energizing the magnet, the magnetite drops back in place.

In order to prevent leakage of the dirty influent into the cleaner mechanism and thence through the area of lessened resistance of the filter bed, which would contaminate the clean effluent, the cleaner mechanism is sealed against the entrance of such unfiltered liquid. This seal may consist of buoyant drums 21 and 22 at the front and rear of the cleaner mechanism each of which is mounted on axles 23 held in the side walls 14, wipers 24 being arranged on the ends of the drums to make a sliding water-tight joint between them and the cleaner mechanism side walls 14, while side walls 14 extend down into the bed material. Each of the drums is provided with a series of laterally projecting cleats 25 adapted to dig into the sand of the bed a substantial distance to assist in maintaining a water-tight joint with the bed, all substantially as described in the applicant's co-pending application Serial No. 152,771.

Under these circumstances, it will be apparent that, with the level of influent I above the bed at a point slightly below the top of the drums 21 and 22, the effluent at a lower level E but above the level of the top of weir 19 which establishes a wash water level W, immediately a zone of lessened resistance is created in the filter bed beneath the agitation-creating means 18, there will be a back flow of clean effluent from below the bed up through this zone of lessened resistance and up over the top of weir 19, carrying with it the dirt loosened from the bed. Due to the fact that the buoyant drums 21 and 22 make a substantially water-tight joint with the bed and the side walls 14 of the cleaner mechanism, dirty influent is prevented from leaking into the cleaner mechanism which otherwise might flow down through the bed at its area of lessened resistance and thus contaminate the clean effluent below.

While the above mechanism has been described with particular reference to a filter of the downflow type, yet it is equally applicable to those of the upflow systems, the only difference being that the influent would approach the filter from the bottom and be at a higher level than the clean effluent that would appear on top of the filter. In such case, an area of agitation would be created as before, the flood of influent therethrough flowing the wash water over the top of weir 19 for disposal as above described. Even in such circumstances, however, it is important that the cleaner mechanism maintain a substantially water-tight joint with the bed because otherwise there would be a tendency for the dirty influent rushing through the area of lessened resistance in the filter bed to escape outside of the cleaner mechanism and into the clean effluent. The fact that the drums 21 and 22 maintain this efficient seal prevents this deleterious action, therefore, even in the case of upflow filters.

It will be apparent from the above that both in up and downflow filters, due to the fact that the sealing contact of the cleaner mechanism with the bed is a rather restricted edge, that is at the bottom portion of the drums, it is important that where such drums contact with the bed, that the latter should be substantially level and any hills, valleys or ripples occurring in the bed surface be eliminated prior to the passage of the drums thereover. This may be readily accomplished by the provision of a plow moving ahead of and/or behind the cleaner. A particularly efficient form of device is shown to consist of an inverted V-element 26 secured between end members 27 which are carried by adjustable links 28 secured to the side walls 14. Extensible rods 29, secured to the frame of the cleaner mechanism and attached to the plow 26, assists in determining the relationship between the plow, cleaning mechanism and the top of the bed. As shown, the plow 26 consists of a vertical wall 30 and an angular wall 31, the former being closer to the cleaning mechanism proper than the latter. Shoes 32 carried by end plates 27 ride on top of L irons 33 and thus the plows may be made to determine the bed level, although they can be raised from this position by means of links 28 and rods 29. The L irons 33 determine the lateral extent of the bed. By adjusting the links 28 and rods 29, the plows may be made to extend in a direction parallel to the axis of the buoyant rollers or at an angle thereto. As shown in Fig. 1, when the cleaning mechanism is traveling in the direction of the arrow and toward an end wall, where the mechanism is installed in a horizontal tank, or simply round and round in a circular tank, the plow ahead of the cleaner skims off the tops of the hills and deposits the material thereof in the valleys, while the plow behind the cleaner, that is, at the left hand side, scrapes up a quantity of the filter bed material by reason of its vertical wall 30 and rolls this material ahead of it, taking off the tops of any hills and depositing them in the valleys so that on the next movement of the cleaner mechanism over that area, the bed will be in a substantially level condition and thus sealing will be facilitated. In horizontal tanks, of which Fig. 1 is a specific illustration, when the end wall is reached, the angular face 31 of the plow ahead of the cleaner will be forced beneath the pile of accumulated bed material at the wall, any excess will spill over the top thereof and upon reversal of movement of the cleaner mechanism, the bed material in front of the vertical wall will be pushed ahead of it, while that resting upon the angular face will be gently and evenly distributed as the plow moves away from that accumulation. During movement in either direction, if the bed material in front of the vertical face builds up excessively, it will spill over the apex of the plow and slide gently off the rear face.

Where desired, by suitably adjusting the links 28 and rods 29, the plows may be made to rest on the bed in an angular relationship with the axis of the buoyant drums. Under these circumstances, the plows tend to redistribute accumulated bed material at the sides of the filter canal.

In circular tanks, where the cleaner moves continually in one direction only, the rear plow may be eliminated and the plow ahead of the cleaner so arranged that the vertical face is at the front of the plow. Under these circumstances, the bed is levelled immediately ahead of the cleaner so as to assure efficient sealing.

While in Fig. 1 the effluent is shown as passing from beneath the filter bed endwise thereof, and over a weir 6, yet this is simply for the purpose of ease of illustration. Obviously the effluent discharge may be either as shown or lengthwise of a rectangular tank or in the form of an annular launder in circular tanks. These features are not illustrated because they are very common practice in this art.

While the invention has been shown and described with particular reference to specific embodiments, it is not to be limited thereto but is to be construed broadly and restricted solely by the scope of the appended claims.

I claim:

1. In combination, a filter bed, a cleaner mechanism adapted to travel thereover including a caisson, sealing means at the front, rear and both sides of the caisson, making a substantially water-tight contact with the filter bed and a plow attached to and movable with the cleaner, the lower edge of which engages the upper portion of the bed material so as to level any irregularities that may exist in the bed, the plow being of a height such that excess accumulated bed material may spill over the top thereof, and said plow being of generally inverted V shape having a vertical face at the side thereof closest to the caisson and an angular face at the opposite side thereof extending downwardly and away from the cleaner caisson.

2. In combination, a filter bed, a cleaner mechanism adapted to travel thereover including a caisson, sealing means at the front, rear and both sides of the caisson, making a substantially water-tight contact with the filter bed and a plow attached to and movable with the cleaner, the lower edge of which engages the upper portion of the bed material so as to level any irregularities that may exist in the bed, the plow being of a height such that excess accumulated bed material may spill over the top thereof, and means for adjusting the plow in a vertical direction and in a horizontal direction toward and away from the caisson.

3. In combination, a filter bed, a cleaner mechanism adapted to travel thereover including a caisson, sealing means at the front, rear and both sides of the caisson, making a substantially water-tight contact with the filter bed and plows attached to and movable with the cleaner, the lower edge of which engage the upper portion of the bed material so as to level any irregularities that may exist in the bed, the plows being of a height such that excess accumulated bed material may spill over the top thereof, said plows being arranged before and behind the cleaner, each plow being of generally inverted V shape and having a vertical wall facing the cleaner mechanism and an angular wall extending outwardly and downwardly in a direction away from the cleaner caisson.

CHARLES EDWARD FRASER.